United States Patent
Wang et al.

(10) Patent No.: US 12,447,629 B2
(45) Date of Patent: Oct. 21, 2025

(54) TRACTION ROBOT, CONVEYING SYSTEM AND METHOD FOR CONTROLLING TRACTION ROBOT

(71) Applicant: JINGDONG TECHNOLOGY INFORMATION TECHNOLOGY CO., LTD., Beijing (CN)

(72) Inventors: Hui Wang, Beijing (CN); Chenguang Gui, Beijing (CN); Xiujun Yao, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 495 days.

(21) Appl. No.: 18/003,247

(22) PCT Filed: Jun. 18, 2021

(86) PCT No.: PCT/CN2021/100897
§ 371 (c)(1),
(2) Date: Dec. 23, 2022

(87) PCT Pub. No.: WO2021/259161
PCT Pub. Date: Dec. 30, 2021

(65) Prior Publication Data
US 2023/0256620 A1 Aug. 17, 2023

(30) Foreign Application Priority Data
Jun. 23, 2020 (CN) .......................... 202010584010.X

(51) Int. Cl.
*B25J 15/00* (2006.01)
*B25J 5/00* (2006.01)
(Continued)

(52) U.S. Cl.
CPC ............ *B25J 15/0023* (2013.01); *B25J 5/007* (2013.01); *B25J 9/0009* (2013.01); *B60D 1/14* (2013.01); *B60D 2001/001* (2013.01)

(58) Field of Classification Search
CPC ........ B25J 15/0023; B25J 5/007; B25J 9/0009; B60D 1/14; B60D 2001/001; B60D 1/00; B60D 2001/005; B62D 49/0664
See application file for complete search history.

(56) References Cited

U.S. PATENT DOCUMENTS

| | | | |
|---|---|---|---|
| 9,457,477 B1 * | 10/2016 | Rublee | B25J 15/0023 |
| 2004/0256166 A1 | 12/2004 | Holtan et al. | |
| 2016/0331556 A1 | 11/2016 | Wijesundara et al. | |

FOREIGN PATENT DOCUMENTS

| | | |
|---|---|---|
| CN | 107878131 A | 4/2018 |
| CN | 107878135 A | 4/2018 |

(Continued)

OTHER PUBLICATIONS

Extended European Search Report issued in counterpart Europe Patent Application No. 21829457.7, dated Jul. 12, 2024.
(Continued)

*Primary Examiner* — Basil T. Jos
(74) *Attorney, Agent, or Firm* — Westbridge IP LLC

(57) ABSTRACT

Disclosed is a traction robot, a conveyance system and a method for controlling a traction robot. The traction robot includes a main body, and further includes a control assembly and a rotating arm. The rotating arm is rotationally assembled on the main body. The rotating arm comprises a first rotating arm and a second rotating arm. The first rotating arm and the second rotating arm are both provided with a clamping part for clamping a towed article on one side facing the towed article, and expansion members are both provided between the clamping part and the rotating arm. The control assembly drives fluid input into or discharge (Continued)

from the expansion member to control expansion or retraction of the expansion member, so as to control the clamping part to clamp or release the towed article.

20 Claims, 5 Drawing Sheets

(51) Int. Cl.
  *B25J 9/00* (2006.01)
  *B60D 1/14* (2006.01)
  *B60D 1/00* (2006.01)

(56) References Cited

FOREIGN PATENT DOCUMENTS

| | | | |
|---|---|---|---|
| CN | 108297969 | A | 7/2018 |
| CN | 108568801 | A | 9/2018 |
| CN | 109177666 | A | 1/2019 |
| CN | 208629425 | U | 3/2019 |
| CN | 110395079 | A | 11/2019 |
| CN | 209755212 | U | 12/2019 |
| CN | 210703202 | U | 6/2020 |
| CN | 111619681 | A | 9/2020 |
| CN | 212654441 | U | 3/2021 |
| EP | 3090887 | B1 | 9/2019 |
| FR | 2649087 | A1 | 1/1991 |
| JP | H06335889 | A | 12/1994 |
| WO | 2012125903 | A2 | 9/2012 |
| WO | 2016165721 | A1 | 10/2016 |

OTHER PUBLICATIONS

First Office Action issued in counterpart Chinese Patent Application No. 202010584010.X, dated Jul. 25, 2024.
First Search Report issued in counterpart Chinese Patent Application No. 202010584010.X, dated Jul. 25, 2024.
International Search Report issued in corresponding PCT Application No. PCT/CN2021/100897, dated Sep. 8, 2021.
Written Opinion issued in corresponding PCT Application No. PCT/CN2021/100897, dated Sep. 8, 2021.
Notification to Grant Patent Right for Invention issued in counterpart Chinese Patent Application No. 202010584010.X, dated Jun. 16, 2025.
Second Office Action issued in counterpart Chinese Patent Application No. 202010584010.X, dated Feb. 22, 2025.

* cited by examiner

TRACTION ROBOT, CONVEYING SYSTEM AND METHOD FOR CONTROLLING TRACTION ROBOT

CROSS-REFERENCE TO RELATED APPLICATIONS

This application is the National Stage of International Application No. PCT/CN2021/100897, filed on Jun. 18, 2021, which claims all the rights and interests to Chinese Patent Application No. 202010584010.X, entitled "TRACTION ROBOT, CONVEYING SYSTEM AND METHOD FOR CONTROLLING TRACTION ROBOT" and filed with China National Intellectual Property Administration on Jun. 23, 2020, all contents of which are incorporated herein by reference.

TECHNICAL FIELD

The present application relates generally to the field of intelligent robots and more particularly to a traction robot, a conveying system and a method for controlling a traction robot.

BACKGROUND

With the development of science and technology and the continuous improvement of modern people's material living standards, intelligent distribution robots are widely used in transportation, cleaning, administration, medical care, elderly monitoring and other aspects, gradually changing some people's lifestyles and playing an important role, bringing convenience to people's life and work.

At present, in the use environment such as office buildings or hospitals, when transporting and transferring documents, medicines, equipment and other materials, carts or other manual mobile equipment are used, and the mobile equipment needs to be connected in the hand support, or it is necessary to preset a connecting part on the towed article. It is also necessary to manually connect parts such as ropes or iron wires for manual binding connection. When supporting, it often takes up a lot of manpower because of the inconvenience of connection, and the moving efficiency is low and the stability is poor. Moreover, in order to tow different towed articles, positions of the preset connecting parts are often different, which requires that the positions of the preset connecting parts of different towed articles need to be identified when binding, and more labor costs need to be invested, which brings more inconvenience to users, and further reduces the universality of use of robots.

SUMMARY

According to one aspect of the present disclosure, a traction robot is provided, the robot includes a main body, a control assembly and a rotating arm, the rotating arm is rotationally assembled on the main body;
 the first rotating arm and the second rotating arm are both provided with a clamping part for clamping a towed article on one side facing the towed article, and expansion members are both provided between the clamping part and the rotating arm; and
 the control assembly drives fluid input into or discharge from the expansion member to control expansion or retraction of the expansion member, so as to control the clamping part to clamp or release the towed article.

In some embodiments, the clamping part is provided on a surface of the expansion member facing the towed article.

In some embodiments, the first rotating arm and/or the second rotating arm are provided with a plurality of the expansion members, the plurality of the expansion members are distributed in an array, and the plurality of the expansion members on a single rotating arm communicate with each other, or the plurality of the expansion members communicate with each other as a set.

In some embodiments, the control assembly comprises a control box, a control gas path for transmission is provided between the control box and the expansion member, the control gas path respectively controls and communicates with the plurality of the expansion members, or the control gas path controls and communicates with a set of the expansion members where a plurality of the expansion members communicate with each other.

In some embodiments, the control assembly further comprises a sensor, the sensor is provided on the side of the clamping part and/or the rotating arm facing the towed article, the sensor being electrically connected to the control box.

In some embodiments, the rotating arm and/or the clamping part are provided with a plurality of the sensors, and the plurality of the sensors are distributed at an angle with each other on the rotating arm and/or the clamping part.

In certain embodiments, a plurality of the sensors are arranged as a first set of sensors and a second set of sensors, the first set of sensors comprises a plurality of the sensors extending along a first direction and the second set of sensors comprises a plurality of the sensors extending along a second direction, the first direction and the second direction being perpendicular to each other.

In some embodiments, the first set of sensors is arranged at an outer end of the rotating arm, the second set of sensors extends from an outer end to an inner end of the rotating arm.

In some embodiments, a plurality of the expansion members are distributed on both sides of the second set of sensors extending linearly. In some embodiments, a plurality of the expansion members on the rotating arm are all provided on the inner side of the first set of sensors.

In some embodiments, the control assembly further comprises a signal acquisition device, the signal acquisition device is electrically connected to the control box.

In some embodiments, the expansion member is a flexible pouch.

In some embodiments, the traction robot further comprises a rotating mechanism, the rotating mechanism is fixedly fitted to the main body, the rotating mechanism being rotationally connected to one end of the first rotating arm and the second rotating arm through an output shaft.

In some embodiments, the first rotating arm and the second rotating arm are slidably fixed to the output shaft through a fixed shaft seat.

In some embodiments, the traction robot further includes a driving wheel assembly, the driving wheel assembly is fixedly supported on the bottom of the main body, and the control assembly can control the driving wheel assembly to move the main body.

According to another aspect of the present disclosure, a conveyance system is provided, including the traction robot of the present disclosure.

According to another aspect of the present disclosure, a method for controlling a traction robot is provided, the method including:
 obtaining a docking command;

driving the traction robot into a travel position;
triggering a clamping signal if it is detected that a towed article enters a docking range;
driving fluid to input into an expansion member on a clamping part for clamping the towed article according to the clamping signal to control expansion of the expansion member, thereby driving the clamping part to clamp the towed article; and
obtaining a release command, driving fluid to output from the expansion member to control the contraction of the expansion member, thereby driving the clamping part to release the towed article.

In some embodiments, before or after driving the traction robot into the travel position, further comprising: driving the clamping part to move relative to the traction robot to a docking position of the clamping part.

In some embodiments, triggering the clamping signal if it is detected that the towed article enters the docking range comprises:
obtaining a state signal of the towed article in the docking range;
determining the type of the towed article according to the state signal obtained;
determining a corresponding docking position threshold according to the type of the towed article; and
judging whether the clamping part has entered the docking position according to the docking position threshold.

In some embodiments, triggering the clamping signal if it is detected that the towed article enters the docking range further comprises:
obtaining an approach signal of the towed article;
starting to detect a position signal of the towed article according to the approach signal; and
determining an in-position signal of the towed article according to whether a relative distance between the clamping part and the towed article enters a preset threshold.

In some embodiments, triggering the clamping signal if it is detected that the towed article enters the docking range further comprises:
according to whether a relative distance between the clamping part and the towed article reaches a preset threshold,
sending a moving on for docking command to control driving the traction robot to move on towards a range of the preset threshold value if the preset threshold is not reached; and
triggering the clamping signal if the preset threshold value is reached.

In some embodiments, driving fluid to input into the expansion member on the clamping part for clamping the towed article according to the clamping signal to control the expansion of the expansion member, thereby driving the clamping part to clamp the towed article, comprises:
judging whether a clamping force between the expansion member and a clamping surface of the towed article meets a requirement for traction;
increasing area of a force-bearing surface between the expansion member and the clamping surface of the towed article, and sending a command to drive the fluid to input into the expansion member at a corresponding force-bearing surface if the requirement for traction is not met; and
keeping clamped if the requirement for traction is met.

In certain embodiments, the present disclosure provides a traction robot which is convenient for connecting and towing and has a wide range of applications, a conveyance system, and a control method thereof.

In certain embodiments, by arranging a clamping part on a rotating arm for clamping the towed article, and arranging an expansion member between the rotating arm and the clamping part, fluid can be driven into or out of the expansion member by a control assembly, to control the clamping part to tighten or release a clamped article. The expansion amount or the retraction amount of the expansion member can be changed by the control assembly according to the structure of the surface to be clamped of the towed article, so as to carry out clasping traction on the surface to be clamped of the towed article with different structures, thus being suitable for clamping and moving different towed article, thereby improving the practicability of the traction robot and the simplicity in the structure thereof. In certain embodiments, the traction robot of the present application can clamp the towed article more conveniently. and yet it is not necessary to preset a connecting part on the towed article, thereby improving the efficiency of towing and moving, avoiding the waste of manpower, being suitable for towing different towed articles in different application environments, significantly improving the universality and convenience of the traction robot, and being suitable for popularization and use in a large scope.

BRIEF DESCRIPTION OF THE DRAWINGS

The accompanying drawings which are incorporated in and form a part of the disclosure illustrate embodiments consistent with the disclosure and together with the description serve to explain the principles of the disclosure.

In order to explain the technical proposal of the present disclosure more clearly, the drawings required for use in the present disclosure will be briefly introduced below, and it will be obvious that other drawings can be obtained from these drawings without creative labor for those of ordinary skill in the art.

Figure 1:
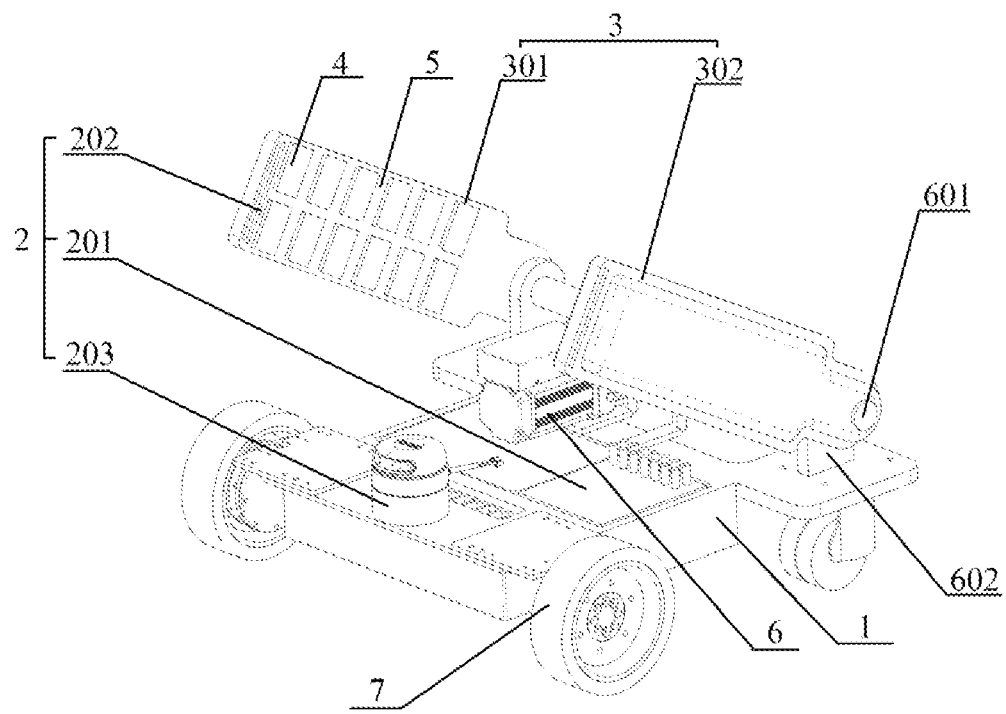
FIG. 1 is a schematic diagram of the overall structure of a traction robot shown according to an exemplary embodiment of the present disclosure.

The reference numerals are described as follows:

1. main subject; 2. control assembly; 201. control box; 202, sensor; 203, signal acquisition device; 3. rotating arm; 301, first rotating arm; 302, second rotating arm; 4. expansion member; 5, a clamping part; 601, output shaft; 602, fixed shaft seat; 603, fixed seat; 604, double-shaft reducer; 7. driving wheel assembly; 8. upper cover.

DETAILED DESCRIPTION

In order to make the purposes, technical solutions and advantages of the disclosed embodiments clearer, the following will be combined with the drawings in the disclosed embodiments. The technical aspects of the embodiments of the present disclosure are clearly and completely described and it is apparent that the described embodiments are part of and not all of the embodiments of the present disclosure. Based on the embodiments in the present disclosure. All other embodiments obtained without creative effort by those of ordinary skill in the art fall within the scope of protection of the present disclosure.

In the prior art, when a distribution traction robot is used to transmit or transport items in a specific environment, it is often necessary to use different towed articles, such as a trolley, a moving box plate or a wheel column towed article. When a traction robot is used to transport different items, it is necessary to preset a connecting part at different positions of a towed article and manually tie a towed article. This leads to inconvenience in use and causes great waste in manpower, Therefore, the application range of a traction robot is limited. Since the connection between an existing traction robot and a towed article is inconvenient during using an existing traction robot and the universality of use is poor, users need to use different kinds of traction robots, which increases the use cost of users.

In order to improve the convenience in the connection between a traction robot and a towed article, reduce manpower, improve the universality of the traction robot, reduce the use cost of the traction robot, a traction robot in the present disclosure includes a main body 1, and further includes a control assembly 2 and a rotating arm 3, where the rotating arm 3 is rotationally assembled on the main body 1, so as to facilitate storing and reduce the overall volume. The rotating arm 3 includes a first rotating arm 301 and a second rotating arm 302. The first rotating arm 301 and the second rotating arm 302 are each provided with a clamping part 5 for clamping a towed article on one side facing the towed article. The clamping part 5 is fixedly connected with the first rotating arm 301 and/or the second rotating arm 302 in a detachable manner through an elastic member, and expansion members 4 are both provided between the clamping part 5 and the rotating arm 3. The control assembly 2 drives fluid input into the expansion member 4 or to be withdrawn to control the expansion or retraction of the expansion member 4, thereby controlling the clamping part 5 to clamp or release the towed article, so that the expansion member 4 can be controlled to hold or release the towed article directly or indirectly through the clamping part 5.

In the present disclosure, the filling amount between the expansion member 4 and the towed article is adjusted by the control assembly 2. In other words, the control assembly 2 can adjust the pressure of contact between the expansion member 4 and different positions of the towed article, to hold tightly or relax the towed article, thereby adjusting the force contact area between the expansion member 4 and the towed article. It can facilitate towing the towed articles with different surfaces to be clamped, without presetting connecting parts on the towed article, improving the convenience and universality of the traction robot, and it is even not necessary for users to replace different traction robots to achieve the purpose of towing different towed articles, thus reducing the use cost of users.

Referring to FIG. 1, which is a schematic diagram of the overall structure of a traction robot shown according to an exemplary embodiment of the present disclosure. As an example, the clamping part 5 and the rotating arm 3 which are matched with the expansion member 4 to can be provided with a storage cavity (not shown in the figure) for storing the expansion member 4. When traction is needed, the control assembly 2 can drive fluid into an expansion member 4 between the rotating arm 3 and the clamping part 5 and/or an expansion member 4 on the surface of the clamping part 5.

It should be understood that, those skilled in the art may adjust the distance between the first rotating arm 301 and the second rotating arm 302, such that after the expansion member 4 is expanded, there is sufficient pressure between the clamping part 5 and the towed article to meet the purpose of traction. The control assembly 2 can also adjust and control driving fluid at different positions in a certain extent, the expansion amount or contraction amount of the expansion member 4 so as to adjust the distance and the force contact area between the clamping part 5 and the towed article, thereby meeting the traction force and clamping force required by the towed article and improving the traction stability.

It should be noted that, in the present disclosure, the clamping part 5 and the rotating arm 3 can be movably and fixedly connected by an elastic member. In some embodiments, an elastic buckle or spring structure may be used for connection, and when the expansion member 4 between the clamping part 5 and the rotating arm 3 is not needed, the expansion member 4 may be accommodated in the accommodation cavity, and the towed article is only clamped and towed by the clamping part 5. It should be understood that, the elastic buckle or spring is only a specific embodiment capable of elastically connecting the clamping part 5 and the rotating arm 3. According to the design principle of the present disclosure, those skilled in the art can use other connection methods with certain restoring force to connect the clamping part 5 and the rotating arm 3, such as telescopic rods, which will not be repeatedly described here.

In addition, it should be understood by those skilled in the art that, according to the actual use, as an embodiment of the present disclosure, the control assembly 2 can drive fluid only input into the expansion member 4 between the rotating arm 3 and the clamping part 5, such that the towed article can directly contact and be clamped by the clamping part 5, thus the service life of the expansion member 4 can be prevented from being affected after the expansion member 4 is directly in force-bearing contact with the towed article. The expansion member 4 can change the distance between the clamping part 5 and a surface to be clamped according to the filling amount of the fluid, and adjust the inclination angle of the clamping part 5 relative to the surface to be clamped so that the clamping part 5 is closely attached to the surface to be clamped, thus increasing the force-bearing contact area between the clamping part 5 and the towed article, thereby improving the stability of the process of the clamping and traction.

In some embodiments, in order to improve the stability of the clamping process, the clamping part 5 can be arranged as a circular arc structure or a plate structure with a plurality of arrays densely arranged, which can better cooperate with the expansion member 4 and increase the force contact area between the clamping part 5 and the towed article.

In some embodiments, the clamping part 5 is provided on the surface of the expansion member 4 at one side facing the towed article. It should be understood that, the expansion member 4 is arranged between the rotating arm 3 and the clamping part 5, that is, the three constitute a "sandwich" structure, so that the clamping part 5 is used as a force-bearing contact surface directly with the towed article. In this way, a problem that insufficient rigidity of the expansion member 4 at the force-bearing contact surface driven by fluid, which leads to insufficient traction of the heavier towed article, can be avoided, and the traction robot can be ensured to provide a sufficient traction force, thus prolonging the service life of the expansion member 4 in the repeated use process.

In some embodiments, in order to improve the clamping force between the clamping part 5 and the towed article, the clamping part 5 can be arranged as a continuous wave-shaped structure according to the situation, so that the upright post of a trolley can be clamped in the wave structure of the clamping part 5 when towing, such as a trolley, and the problem that the upright post falls off during the towing process can be avoided.

Those skilled in the art will be able to understand that, the structure of the clamping part 5 can be adjusted according to the actual use situation or the structure of the towed article. In the present disclosure, the clamping part 5 can be in an elastical movable connection with the rotating arm 3, which is convenient for users to exchange the clamping part 5 with different shapes and structures during use, which is used for adapting to towing different towed articles, further expanding the universality of use, and reducing the use cost of users.

Figure 3:
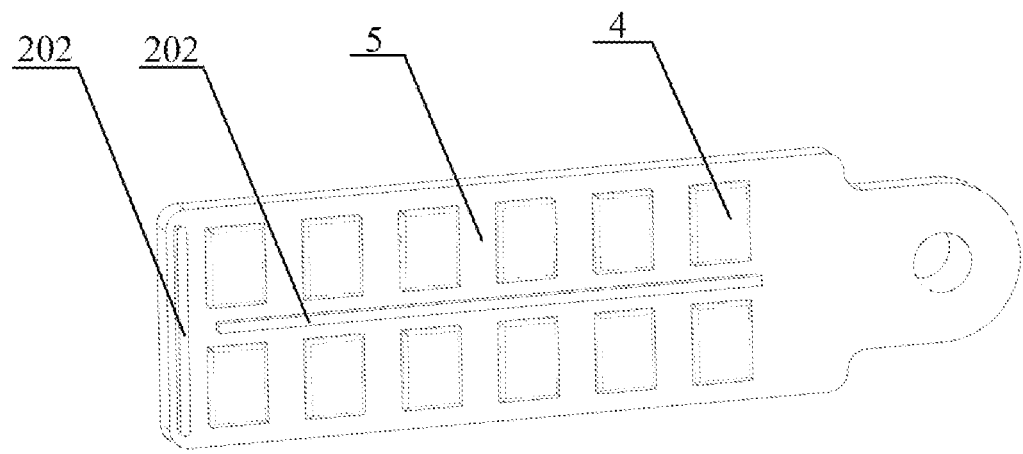
FIG. 3 is a schematic structural diagram of a rotating arm in a traction robot shown according to an exemplary embodiment of the present disclosure.

Referring to FIG. 3, which is a schematic structural diagram of a rotating arm in a traction robot shown according to an exemplary embodiment of the present disclosure. In some embodiments, the first rotating arm 301 and/or the second rotating arm 302 is provided with a plurality of the expansion members 4. The plurality of the expansion members 4 are distributed in an array. The plurality of the expansion members 4 on a single rotating arm 3 communicate with each other, or the plurality of the expansion members 4 communicate with each other as a set.

In this embodiment, a plurality of expansion members 4 are provided, which are distributed on the first rotating arm 301 and/or the second rotating arm 302, and can be individually arranged on the first rotating arm 301 or the second rotating arm 302, or arranged respectively on the first rotating arm 301 and the second rotating arm 302. Under the control action of the control assembly 2, those skilled in the art can control part of or all of the expansion members 4 which are located on the first rotating arm 301 or the second rotating arm 302 to clamp the towed article for traction according to the traction requirements, and since the expansion members 4 are dispersed, the fluid can be driven into the expansion members 4 at different positions through the control assembly 2, so as to increase the traction force at the corresponding positions of the towed article and further improve the convenience and universality of use. Similarly, those skilled in the art can also distribute the expansion member 4 array on the surface of the clamping part 5 to achieve the same technical effect, and those skilled in the art can make detailed adjustment according to the actual situation of use, and the embodiment is not limited to a specific form.

In some embodiments, the control assembly 2 includes a control box 201. A transmission control gas path (not shown in the figure) is provided between the control box 201 and the expansion members 4. The control gas path respectively controls communication with a plurality of the expansion members 4, or the control gas path controls a set of the expansion members 4 in which a plurality of the expansion members 4 communicate with each other.

In certain embodiments, the control air path can be arranged as an air pipe communicating the expansion member 4 and the control box 201. To better fix the air pipe, a groove for accommodating a fixed air pipe can be provided at a corresponding position of the rotating arm 3 and/or the clamping part 5 corresponding to the position of the expansion member 4. The control box 201 may be provided with a pneumatic control box 201, and in order to improve the control precision, in some embodiments, a corresponding control valve can be arranged in the control air path. A force-bearing contact pressure between the expansion member 4 and the towed article can be regulated through the control valve, thereby accurately adjusting the traction force when the traction robot tows different towed articles, which is suitable for more application places.

In some embodiments, the control assembly 2 further comprises a sensor 202. The sensor 202 is provided on the side of the clamping part 5 and/or the rotating arm 3 facing the towed article. The sensor 202 is electrically connected to the control box 201.

In certain embodiments, the sensor 202 may be provided as an infrared distance sensor 202. The sensor 202 may be arranged on the side of the clamping part 5 and/or the rotating arm 3 close to the expansion member 4. When the traction robot is used to tow the towed article. the positional relationship between the expansion member 4 or the clamping part 5 and the towed article can be obtained. The sensor 202 collects the acquired signal to the control box 201, and the control box 201 drives the fluid to make the expansion member 4 at the corresponding position expand or contract according to a signal prompt, and can effectively control the expansion amount of the expansion member 4 to clamp or release the towed article, thus controlling the expansion member 4 more accurately, effectively improving the reasonable utilization rate of resources and avoiding resource waste.

As will be understood those skilled in that art, an infrared distance sensor 202 is only one example among all kinds of a sensor 202 capable of implementing the present disclosure. A pressure sensor 202 or a speed sensor 202 can also be selected, which can be arranged on the expansion member 4 or the clamping part 5, and can monitor the contact pressure or traction speed with the towed article, which may also improve the stability and accuracy of the traction process. Those skilled in that art, can also select other kinds of sensor 202 for simple replacement according to actual use.

In some embodiments, the rotating arm 3 and/or the clamping part 5 are provided with a plurality of sensors 202, and the plurality of the sensors are distributed at an angle with each other on the rotating arm 3 and/or the clamping part 5.

In certain embodiments, at least two sensors 202 may be provided. Two sensors 202 are provided perpendicularly to each other at the ends of the rotating arm 3 and/or the clamping part 5, respectively, or provided at the space area between the expansion members 4 correspondingly. The sensors 202 can all adopt infrared distance sensors 202, which can analyze and judge the distance between the expansion member 4 and the towed article from multiple angles when towing the towed articles, thereby improving the control accuracy of the control assembly 2. Preferably, those skilled in the art can also set a corresponding control chip in the control box 201. A corresponding control program can be set and the distance value range of each sensor 202 can be set in advance. When towing different towed articles, different control programs can be started correspondingly. When the distance meets a predetermined value, the expansion members 4 at corresponding positions can be expanded or contracted by driving fluid through the control assembly 2, thus further improving the control accuracy and intelligent degree of the traction robot.

It should be understood that, in the present disclosure, a plurality of sensors 202 may be the same type or different types of sensors 202 which respectively arranged at different positions of the rotating arm 3 and/or the clamping part 5. Moreover, the angles between the plurality of sensors 202 can be adjusted according to the actual situation, and can be arranged in parallel with each other, and can be meshed with the position of the expansion member, and more data information can be collected at multiple angles and directions, thereby improving the control progress. The embodiment does not limit specific forms to the types and positions of the sensors 202.

In certain embodiments, a plurality of the sensors 202 are arranged as a first set of sensors and a second set of sensors, the first set of sensors includes a plurality of the sensors extending along a first direction and the second set of sensors includes a plurality of the sensors extending along a second direction, the first direction and the second direction being perpendicular to each other.

In certain embodiments, a plurality of the sensors 202 may be arranged on the surface of rotating arm or clamp in a linear extension in a first direction and a second direction, and the first direction and the second direction are perpendicular to each other. It should be understood that, the first set of sensors and the second set of sensors may determine distance information from a first direction and a second direction to a towed article, and carries out data acquisition and scanning on the shape information of the towed article, which is convenient for controlling different expansion members to expand and clamp according to different towed articles, thus improving the control precision of the expansion members and expanding the application range of the traction robot.

It should be understood by those skilled in the art that, according to the actual use requirements, in order to improve the control precision of the expansion member, as an example, a plurality of sets of the first set of sensors distributed along the second direction may also be provided, and a plurality of sets of the second set of sensors distributed along the first direction may also be provided, to form a mesh distribution around the expansion members to determine distance information between each expansion member and a towed article, further improving the control accuracy of the expansion members.

In some embodiments, with reference to FIG. 1 and FIG. 3, the first set of sensors is arranged at an outer end of the rotating arm, the second set of sensors extends from an outer end to an inner end of the rotating arm.

It should be understood that when the rotating arm is activated to rotate and tow the towed article, the first set of sensors at the outer end of the rotating arm can detect the position or shape information of the towed article in the first place, to make a preliminary judgment on the type of the towed article. The second set of sensors can feed back the position relationship between the rotating arm and the towed article in real time during the moving process of the traction robot, and the type and structure of the towed article are further judged, so as to improve the control of the expansion amount or contraction amount of the expansion member, which can improve the clamping stability of the traction robot and effectively improve the detection efficiency and control accuracy.

In some embodiments, a plurality of the expansion members are distributed on both sides of the second set of sensors extending linearly. It should be understood that the second set of sensors can accurately sense state information between a plurality of expansion members on both sides and the towed article to control the amount of contraction of the expansion members at corresponding positions. In addition, in some embodiments, the second set of sensors can also be arranged as a plurality of cross-distributed pressure sensors and distance sensors, which can simultaneously detect the clamping pressure between the corresponding towed article and the clamping part or each expansion member, thereby improving the clamping stability of the traction robot.

In some embodiments, a plurality of the expansion members on the rotating arm are all provided on the inner side of the first set of sensors. It should be understood that the expansion member is arranged on the inner side of the first set of sensors. The state information such as the shape, structure or distance of the towed article that can be detected by the first set of sensors can be fed back to the control box, which is convenient for the control box to control the expansion member, further improving the control precision and facilitates clamping and traction according to the shape and structure of different towed articles. Of course, in order to improve the control accuracy, those skilled in the art can also set the first set of sensors around the expansion member to collect more structural information of the towed article, thereby providing control progress.

In some embodiments, the control assembly 2 further includes a signal acquisition device 203, and the signal acquisition device 203 is electrically connected to the control box 201. The signal acquisition device 203 can be arranged on the main body 1, for adjusting the whole traction robot to draw an action map, which is convenient for specifying the traction path during the traction process, further improving the convenience and universality of use. As an example the signal acquisition device 203 may be provided as a lidar signal collector.

In some embodiments, the expansion member 4 is a flexible pouch. It should be clear that, the flexible pouch expansion member 4 can meet the demand of traction force. After the fluid is filled in the flexible pouch by the control assembly 2, the expansion has certain fluidity, which can make the expansion member 4 cling to the surface of the towed article, thereby improving the force force-bearing contact area between the expansion member 4 and the towed article, and is suitable for towing the towed article with different structures, such as the towed article with columnar, toothed or flat structure, thereby further improving the universality of use and reducing the use cost of users. Preferably, in order to increase the traction force and stability between the expanded member 4 and the towed article, a plurality of rubber bumps may be provided on one side of the expansion member 4 facing the towed article, and the present disclosure is not limited to the specific material of the flexible pouch. Those skilled in the art can select the flexible material from the existing disclosure to meet the traction demand accordingly, and the present disclosure is not limited to its specific form.

Figure 2:
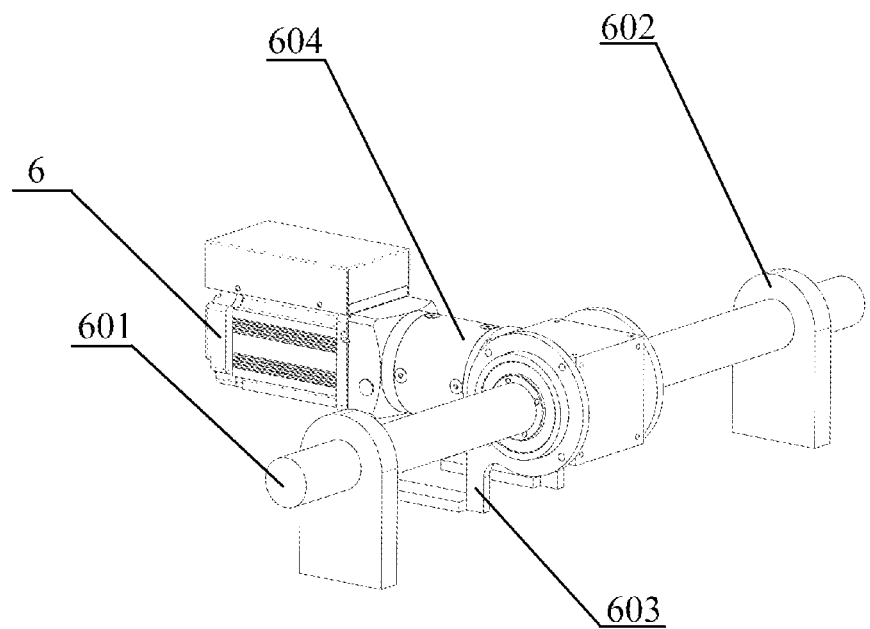
FIG. 2 is a schematic diagram of the structure of a rotating mechanism in a traction robot according to an exemplary embodiment of the present disclosure.

In certain embodiments, referring to FIG. 2, which is a schematic diagram of the structure of a rotating mechanism in a traction robot according to an exemplary embodiment of the present disclosure. In this figure, a rotating mechanism is further included, where the rotating mechanism is fixedly fitted to the main body 1. The rotating mechanism is rotationally connected to one end of the first rotating arm 301 and the second rotating arm 302 through an output shaft 601. As an example, the rotating mechanism can be provided as a motor. The motor can be fixed to the main body 1 through a fixed seat 603, and the motor is connected to a double-shaft reducer 604. One end of the first rotating arm 301 and one end of the second rotating arm 302 are respectively connected to both ends of the output shaft 601 of the double-shaft reducer 604. The motor is electrically connected with the control assembly 2 and connected with the corresponding sensor 202, which can adjust the clamping angle and clamping position between the motor and the towed article and is convenient to store the rotating arm 3 in the main body 1, thus reducing the volume of the overall traction robot.

Figure 4:
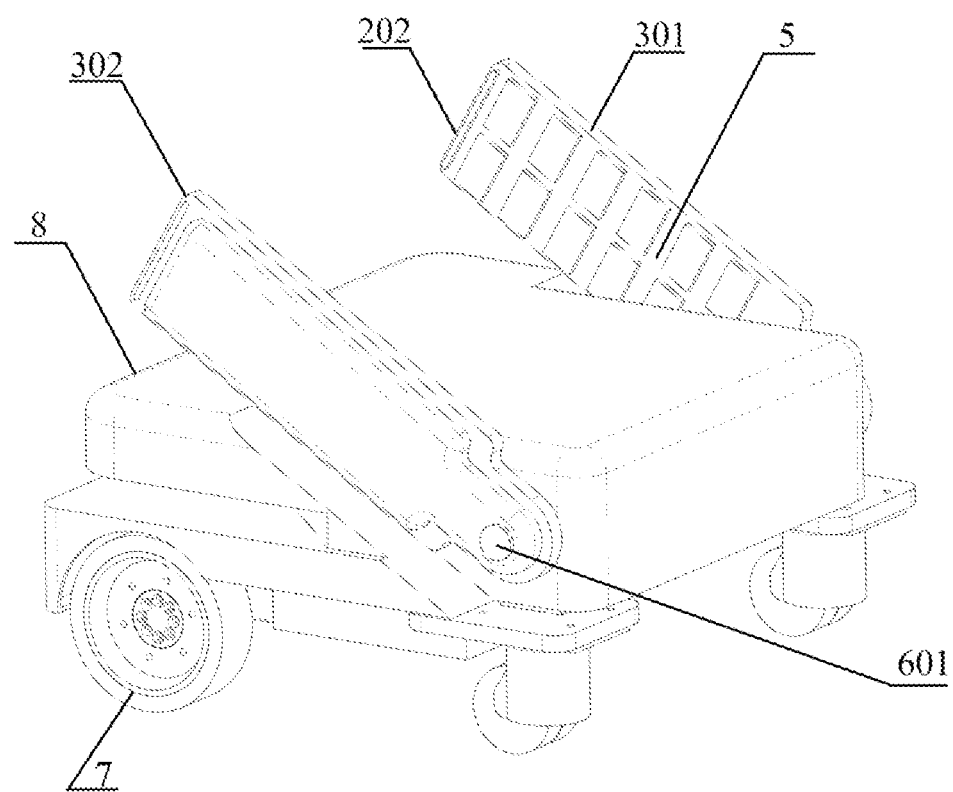
FIG. 4 is a schematic diagram of another overall structure in a traction robot shown according to an exemplary embodiment of the present disclosure.

Referring to FIG. 4, which is a schematic diagram of another overall structure in a traction robot shown according to an exemplary embodiment of the present disclosure. As an example, an upper cover 8 can be provided on the main body 1, so that the upper cover 8 can be buckled on the main body 1, and a limiting groove accommodating for a rotating arm 3 is reserved on the upper cover 8, so that the rotating arm 3 can be stored in the limiting groove through the rotating mechanism when the traction robot is not being used.

In some embodiments, the first rotating arm 301 and the second rotating arm 302 are slidably fixed to the output shaft 601 through a fixed shaft seat 602. As an example, a corresponding slide rail is arranged on the main body 1 at a position relative to the fixed shaft seat 602. The distance between the first rotating arm 301 and the second rotating arm 302 and the towed article is changed by sliding the fixed shaft seat 602 on the slide rail, which is convenient for users to adjust according to the width of the towed article and improves the convenience and universality of use.

In some embodiments, the traction robot further includes a driving wheel assembly 7. The driving wheel assembly 7 is fixedly supported on the bottom of the main body 1, and the control assembly 2 can control the driving wheel assembly 7 to move the main body 1. In certain embodiments, the driving wheel assembly 7 may include a plurality of driving wheels and follow-up wheels, and includes a motor for driving the driving wheel to rotate. In some embodiments, the motor may be electrically connected to a signal acquisition device 203 or a sensor 202 to further improve the position accuracy and positioning accuracy of the traction robot. Those skilled in the art may adjust according to the actual situation. The present disclosure does not limit the specific form of the driving wheel assembly 7.

Figure 5:
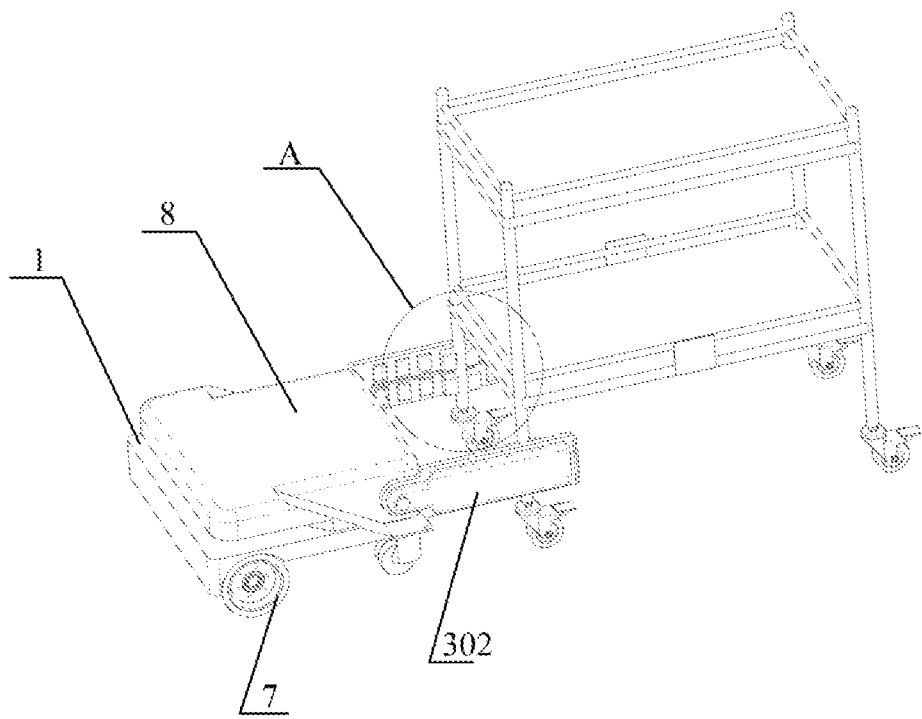
FIG. 5 is a schematic diagram of a traction state structure of a traction robot and a trolley according to an exemplary embodiment of the present disclosure.
Figure 6:
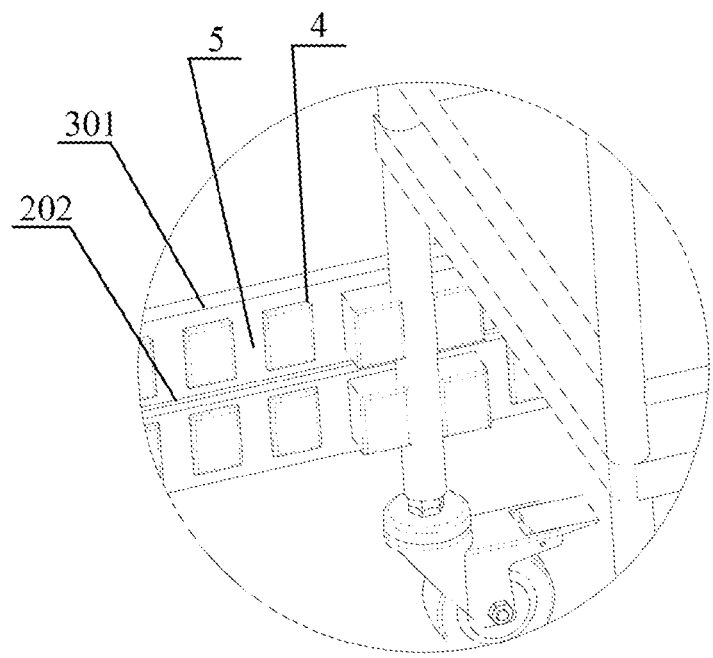
FIG. 6 is an enlarged view of a traction state at A where a traction robot is towed with a trolley according to an exemplary embodiment of the present disclosure.

According to another aspect of the present disclosure, a conveyance system is provided, including the said traction robot. Referring to FIG. 5, which is a schematic diagram of a traction state structure of a traction robot and a trolley according to an exemplary embodiment of the present disclosure, and FIG. 6, which is an enlarged view of a traction state at A where a traction robot is towed with a trolley according to an exemplary embodiment of the present disclosure. According to an embodiment of the present disclosure, when a towed article is a cart, the traction robot rotates the first rotating arm 301 and the second rotating arm 302 to be horizontal through the rotating mechanism, and adjust the relative positions of the first rotating arm 301 and the second rotating arm 302 relative to the upright posts on one side of the cart. The relative position of the upright post will be collected by the sensor 202. The control box 201 can then drive fluid into a corresponding expansion member 4 to expand the expansion member and clamp the upright post between the expansion members 4. It should be understood that it is necessary to ensure that the expansion member 4 is at a position where the expansion width of facing the upright post can at least clamp at the radius of the upright post, so as to further improve the stability of the traction process.

Figure 7:
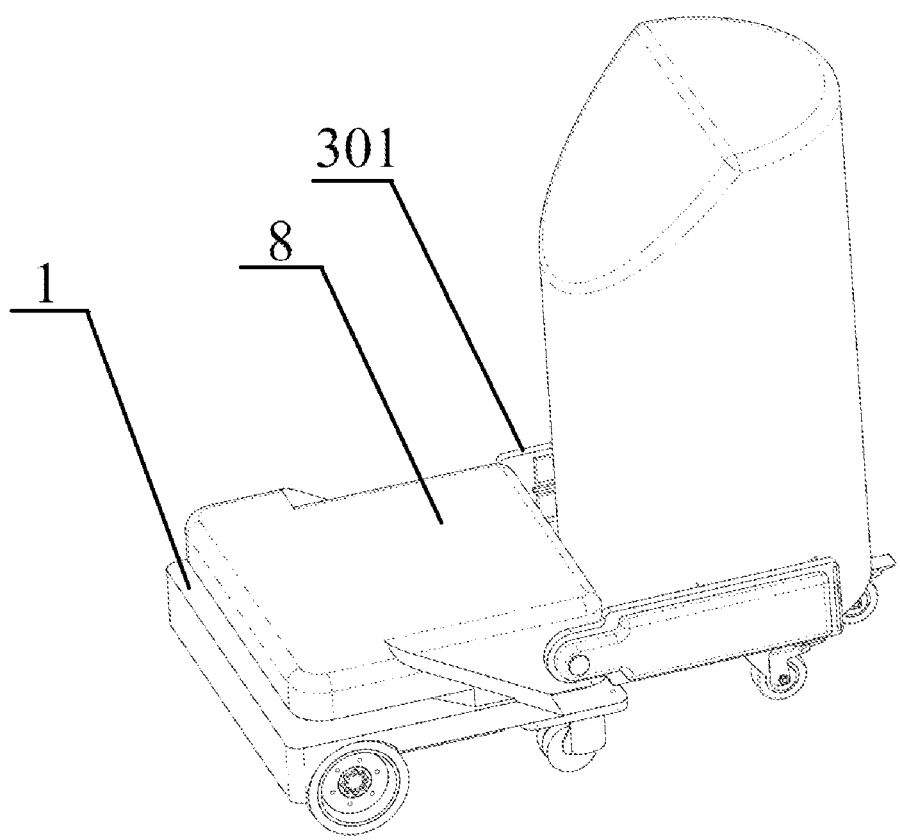
FIG. 7 is a schematic diagram of a traction robot and a wheeled equipment in a traction state structure according to an exemplary embodiment of the present disclosure.
Figure 8:
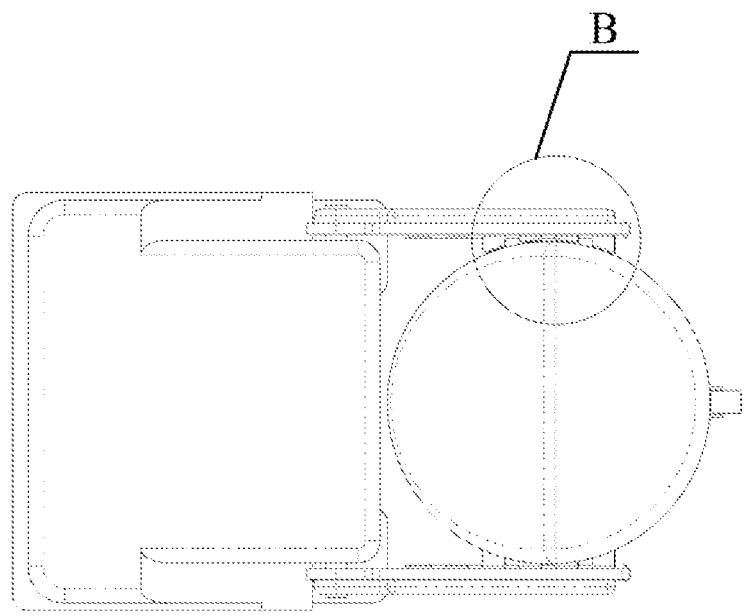
FIG. 8 is a schematic structural diagram of a traction robot and a wheeled equipment in another traction state shown according to an exemplary embodiment of the present disclosure.
Figure 9:
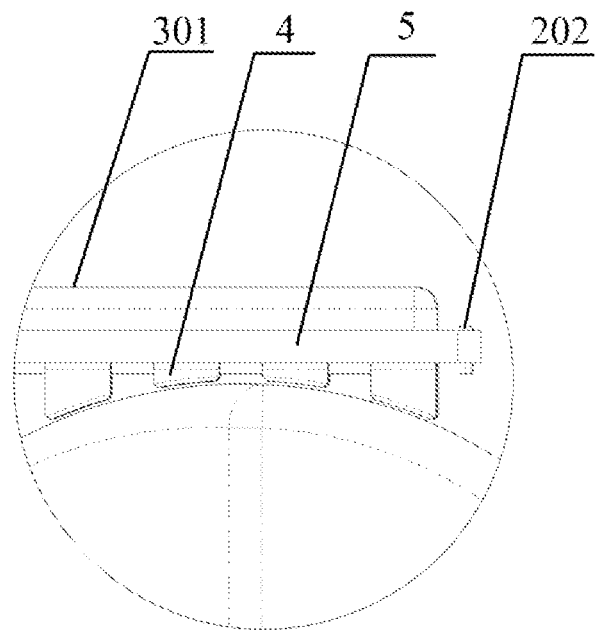
FIG. 9 is an enlarged view of a traction state at B where a traction robot is towed with a wheeled equipment according to an exemplary embodiment of the present disclosure.

Referring to FIG. 7, which is a schematic diagram of a traction robot and a wheeled equipment in a traction state structure according to an exemplary embodiment of the present disclosure. FIG. 8 is a schematic structural diagram of a traction robot and a wheeled equipment in another traction state shown according to an exemplary embodiment of the present disclosure, and FIG. 9 is an enlarged view of a traction state at B where a traction robot is towed with a wheeled equipment according to an exemplary embodiment of the present disclosure. In certain embodiments, when a towed article is a wheeled equipment, a distance signal may be acquired by a sensor 202. The rotating arm 3 and an expansion member 4 at the corresponding position pass through the center line of the wheeled equipment. The traction robot makes the expansion member 4 directly in force contact with the wheeled equipment by adjusting the distance between the first rotating arm 301 and the second rotating arm 302. In addition, since the surface of the wheeled equipment is of an arc structure, the fluid filling amount of the expansion member 4 can be adjusted by the control assembly 2 to make the expansion member 4 cling to the outer wall to be clamped of the wheeled equipment, thereby increasing the force-bearing contact area and further improving the stability of the traction process.

According to another aspect of the present disclosure, a method for controlling a traction robot is provided, which includes:
  obtaining a docking command;
  driving the traction robot into a travel position;
  triggering a clamping signal if it is detected that a towed article enters a docking range;
  driving fluid to input into an expansion member 4 on a clamping part 5 for clamping the towed article according to the clamping signal to control expansion of the expansion member 4, thereby driving the clamping part 5 to clamp the towed article; and
  obtaining a release command, driving fluid to output from the expansion member 4 to control the contraction of the expansion member 4, thereby driving the clamping part 5 to release the towed article.

It should be understood that obtaining the docking command can be manually manipulating the traction robot for docking, or driving the traction robot into a travel position by controlling the traction robot after receiving the docking command by a sensor or a processor.

And the travel position can be preset in a control program with different travel position paths according to different use conditions and the types of most towed articles in advance, and finally drive the traction robot to a predetermined travel position.

In some embodiments, the traction robot is provided with a corresponding detection equipment and a corresponding software program system for detection. When a towed article is detected to enter the docking range, a clamping signal is sent to a processor or a control box, Then, fluid is driven to input into an expansion member 4 on a clamping part 5 for clamping the towed article according to the clamping signal to control expansion of the expansion member 4, thereby driving the clamping part 5 to clamp the towed article. Of course, the detection process can also be judged by human according to the use situation, to control the fluid flow to the expansion member 4 corresponding to the clamping part 5.

After the traction robot completes traction and places the towed article at a predetermined position, the detection equipment and the corresponding software for detection sends a release command that a predetermined position has been reached, to drive the traction robot to release the towed article.

In some embodiments, the fluid can be driven to output from the expansion member 4 to control the contraction of the expansion member 4, thereby driving the clamping part 5 to release the towed article. according to the release command.

In some embodiments, the driving of the traction robot before or after entering the travel position further comprises: driving the clamping part 5 to move relative to the traction robot to the docking position of the clamping part 5.

In certain embodiments, before or after driving the traction robot into the travel position, the method further includes: driving the clamping part 5 to move relative to the traction robot to a docking position of the clamping part 5.

In certain embodiments, before or after driving the traction robot into the stroke position, the clamping part 5 can be driven, for different types of the towed articles, to move to a docking position convenient for clamping. Preferably, the clamping part 5 can be driven to rotate or the clamping part 5 can be driven to move radially, so that the clamping part 5 is aligned with the docking position of the towed article, thereby improving the clamping and control accuracy, so as to facilitate clamping the towed article.

In some embodiments, triggering the clamping signal if it is detected that the towed article enters the docking range includes:
 obtaining a state signal of the towed article in the docking range; the state signal can be set as the shape information of the towed article or the distance information of the towed article from the traction robot, and the state signals of different towed articles can be stored and recorded in advance, and the state signals of the towed articles can be compared and judged with the state signals stored in advance after being obtained, such that different clamping modes can be intelligently adopted by using the traction robot when towing and clamping different towed articles, and the application range of the traction robot and the reliability of the traction performance are improved.
 determining the type of the towed article according to the state signal obtained; according to the comparison between the state signal and the state signal of different towed articles stored in advance, those skilled in the art can preset a certain data acquisition threshold of the state signal according to the actual situation, when the detected towed article status signal falls in a data threshold of a preset certain type of towed article status signal, the detected type of the towed article can be judged as a preset towed article, and traction and clamping processing can be carried out according to the preset type of the towed article, which can reduce the information stored in the state signal of too many manually preset types of the towed article, and improve the convenience and universality of use.
 determining a corresponding docking position threshold according to the type of the towed article; after judging the type of the towed article, the docking position threshold of the pre-stored type of the towed article can be extracted, as an example, the docking position threshold can be set as a position state information that clamping can be stable according to different towed articles, for example, when the docking position of a towed article is a circular upright post, the clamping part 5 can be driven to move to make the upright post move to the middle area of the clamping part 5, or, the clamping part 5 moves outside the center line of the upright post so as to determine the docking position threshold with this. Those skilled in the art can set different docking position thresholds according to the actual type of the towed articles, so that when the clamping part 5 moves into the range of the docking position threshold, the towed articles may possess a stable clamping state.
 judging whether the clamping part has entered the docking position according to the docking position threshold. It should be understood that, when the corresponding docking position threshold is determined, the docking position can be made further accurate, so as to achieve a more stable clamping state. Those skilled in the art can continue to detect the status signal of the towed article within the docking position threshold, and compare it with the preset docking position threshold, and can set an optimal docking position within the docking position threshold, and drive the clamping part 5 to move to the docking position, so as to clamp the towed article at the docking position, thereby improving the clamping stability and avoiding the problem that the towed article falls off from the clamping part 5 during the clamping process, and thus improving the reliability of the traction robot.

In some embodiments, triggering the clamping signal if it is detected that the towed article enters the docking range further includes:
 obtaining an approach signal of the towed article;
 starting to detect a position signal of the towed article according to the approach signal; and
 determining an in-position signal of the towed article according to whether a relative distance between the clamping part 5 and the towed article enters a preset threshold.

In some embodiments, triggering the clamping signal if it is detected that the towed article enters the docking range further includes:
 according to whether a relative distance between the clamping part 5 and the towed article reaches a preset threshold, it should be understood that those skilled in the art can judge the relative distance between the clamping part 5 and the towed article through a detection equipment and a processor and compare it with a preset threshold, and it should be understood that preset threshold can be set according to different types of towed articles,
 sending a moving on for docking command to control driving the traction robot to move on towards a range of the preset threshold value if the preset threshold is not reached; when judging that the traction robot does not reach an orientation of preset threshold, that is, stable clamping cannot be realized between the traction robot and the towed article, to avoid the problem that the towed article falls off in the traction process, the detection equipment is required to send out a docking command, and control and drive the traction robot to continue to move on towards the range of the preset threshold, so that the traction robot enters the preset threshold, thereby improving the accuracy of the clamping position of the traction robot, and triggering the clamping signal if the preset threshold value is reached.

In some embodiments, driving fluid to input into the expansion member 4 on the clamping part for clamping the towed article according to the clamping signal to control the expansion of the expansion member 4, thereby driving the clamping part 5 to clamp the towed article, includes:

judging whether a clamping force between the expansion member 4 and a clamping surface of the towed article meets a requirement for traction;

increasing area of a force-bearing surface between the expansion member 4 and the clamping surface of the towed article, and sending a command to drive the fluid to input into the expansion member 4 at a corresponding force-bearing surface if the requirement for traction is not met; and keeping clamped if the requirement for traction is met.

In addition, the hardware and application programs are easy to be thought of and implemented by those skilled in the art according to the design principles and technical schemes of the present disclosure, and will not be repeated here. It should be noted that relational terms such as "first" and "second" are used herein only to distinguish one entity or operation from another, and do not necessarily require or imply any such actual relationship or order between these entities or operations. Moreover, the terms "including", "including" or any other variation thereof are intended to encompass non-exclusive inclusion, so that a process, method, article or equipment that includes a set of elements includes not only those elements but also other elements that are not explicitly listed or are inherent to such a process, method, article or equipment. In the absence of further limitations, an element defined by the phrase "includes an . . . " does not preclude the existence of another identical element in the process, method, article or equipment in which the element is included.

The foregoing is only a specific embodiment of the present disclosure to enable those skilled in the art to understand or implement the present disclosure. Various modifications to these embodiments will be apparent to those skilled in the art and the general principles defined herein may be implemented in other embodiments without departing from the spirit or scope of the present disclosure. Accordingly, the present disclosure will not be limited to the embodiments shown herein but is intended to conform to the widest scope consistent with the principles and novel features disclosed herein.

The invention claimed is:

1. A traction robot, comprising: a main body, a control assembly and a rotating arm, wherein the rotating arm is rotationally assembled on the main body;

the rotating arm comprises a first rotating arm and a second rotating arm;

the first rotating arm and the second rotating arm are both provided with a clamping part for clamping a towed article on one side facing the towed article, and expansion members are both provided between the clamping part and the rotating arm;

the control assembly drives fluid input into or discharge from the expansion member to control expansion or retraction of the expansion member, so as to control the clamping part to clamp or release the towed article.

2. The traction robot according to claim 1, wherein the clamping part is provided on a surface of the expansion member facing the towed article.

3. The traction robot according to claim 1, wherein the first rotating arm and/or the second rotating arm are provided with a plurality of the expansion members, the plurality of the expansion members are distributed in an array, and the plurality of the expansion members on a single rotating arm communicate with each other, or the plurality of the expansion members communicate with each other as a set.

4. The traction robot according to claim 3, wherein the control assembly comprises a control box, a control gas path for transmission is provided between the control box and the expansion member, the control gas path respectively controls and communicates with the plurality of the expansion members, or the control gas path controls and communicates with a set of the expansion members where a plurality of the expansion members communicate with each other.

5. The traction robot according to claim 4, wherein the control assembly further comprises a sensor, the sensor is provided on the side of the clamping part and/or the rotating arm facing the towed article, the sensor is electrically connected to the control box.

6. The traction robot according to claim 5, wherein the rotating arm and/or the clamping part are provided with a plurality of the sensors, and the plurality of the sensors are distributed at an angle with each other on the rotating arm and/or the clamping part.

7. The traction robot according to claim 5, wherein a plurality of the sensors are arranged as a first set of sensors and a second set of sensors, the first set of sensors comprises a plurality of the sensors extending along a first direction and the second set of sensors comprises a plurality of the sensors extending along a second direction, the first direction and the second direction are perpendicular to each other.

8. The traction robot according to claim 7, wherein the first set of sensors is arranged at an outer end of the rotating arm, the second set of sensors extends from an outer end to an inner end of the rotating arm.

9. The traction robot according to claim 8, wherein a plurality of the expansion members are distributed on both sides of the second set of sensors extending linearly.

10. The traction robot according to claim 8, wherein a plurality of the expansion members on the rotating arm are all provided on the inner side of the first set of sensors.

11. The traction robot according to claim 4, wherein the control assembly further comprises a signal acquisition device, the signal acquisition device is electrically connected to the control box.

12. The traction robot according to claim 1, further comprising a rotating mechanism, the rotating mechanism is fixedly fitted to the main body, the rotating mechanism is rotationally connected to one end of the first rotating arm and the second rotating arm through an output shaft.

13. The traction robot according to claim 12, further comprising a driving wheel assembly, the driving wheel assembly is fixedly supported on the bottom of the main body, and the control assembly controls the driving wheel assembly to move the main body.

14. A conveyance system, comprising the traction robot according to claim 1.

15. A method for controlling a traction robot, comprising:
obtaining a docking command;
driving the traction robot into a travel position;
triggering a clamping signal if it is detected that a towed article enters a docking range;

driving fluid to input into an expansion member on a clamping part for clamping the towed article according to the clamping signal to control expansion of the expansion member, thereby driving the clamping part to clamp the towed article; and obtaining a release command, driving fluid to output from the expansion member to control the contraction of the expansion member, thereby driving the clamping part to release the towed article.

16. The method for controlling a traction robot according to claim 15, wherein before or after driving the traction robot into the travel position, further comprising: driving the clamping part to move relative to the traction robot to a docking position of the clamping part.

17. The method for controlling a traction robot according to claim 15, wherein triggering the clamping signal if it is detected that the towed article enters the docking range comprises:

obtaining a state signal of the towed article in the docking range;

determining the type of the towed article according to the state signal obtained;

determining a corresponding docking position threshold according to the type of the towed article; and judging whether the clamping part has entered the docking position according to the docking position threshold.

18. The method for controlling a traction robot according to claim 15, wherein triggering the clamping signal if it is detected that the towed article enters the docking range further comprises:

obtaining an approach signal of the towed article;

starting to detect a position signal of the towed article according to the approach signal; and determining an in-position signal of the towed article according to whether a relative distance between the clamping part and the towed article enters a preset threshold.

19. The method for controlling a traction robot according to claim 15, wherein triggering the clamping signal if it is detected that the towed article enters the docking range further comprises:

judging whether a relative distance between the clamping part and the towed article reaches a preset threshold, sending a moving on for docking command to control driving the traction robot to move on towards a range of the preset threshold value if the relative distance does not reach the preset threshold; and triggering the clamping signal if the relative distance does not reach the preset threshold.

20. The method for controlling a traction robot according to claim 15, wherein driving fluid to input into the expansion member on the clamping part for clamping the towed article according to the clamping signal to control the expansion of the expansion member, thereby driving the clamping part to clamp the towed article, comprises:

judging whether a clamping force between the expansion member and a clamping surface of the towed article meets a requirement for traction;

increasing area of a force-bearing surface between the expansion member and the clamping surface of the towed article, and sending a command to drive the fluid to input into the expansion member at a corresponding force-bearing surface if the requirement for traction is not met; and keeping clamped if the requirement for traction is met.

* * * * *